(12) United States Patent
Baliosian et al.

(10) Patent No.: US 8,781,459 B2
(45) Date of Patent: Jul. 15, 2014

(54) METHOD OF DISCOVERING OVERLAPPING CELLS

(75) Inventors: Javier Baliosian, Athlone (IE); Rolf Stadler, Stockholm (CH)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1219 days.

(21) Appl. No.: 12/664,145

(22) PCT Filed: Jun. 15, 2007

(86) PCT No.: PCT/EP2007/055960
§ 371 (c)(1),
(2), (4) Date: May 4, 2010

(87) PCT Pub. No.: WO2008/151674
PCT Pub. Date: Dec. 18, 2008

(65) Prior Publication Data
US 2010/0285790 A1    Nov. 11, 2010

(51) Int. Cl.
| | |
|---|---|
| *H04W 4/00* | (2009.01) |
| *H04W 88/02* | (2009.01) |
| *H04W 24/00* | (2009.01) |
| *H04W 16/18* | (2009.01) |
| *H04W 28/04* | (2009.01) |
| *H04L 12/56* | (2006.01) |

(52) U.S. Cl.
CPC .............. *H04W 88/02* (2013.01); *H04W 24/00* (2013.01); *H04W 16/18* (2013.01); *H04W 28/04* (2013.01); *H04L 45/48* (2013.01)
USPC ...................... 455/422.1; 455/67.11; 455/466; 370/395.3; 370/331

(58) Field of Classification Search
CPC ..... H04W 88/02; H04W 24/00; H04W 16/18; H04W 28/04; H04L 45/48
USPC .............. 370/254, 255, 256, 356, 395.3, 329, 370/332, 344, 331; 455/67.11, 422.1, 455/432.1, 435.1, 435.2, 436, 443, 444, 455/446, 448, 449, 561, 404.2, 434, 509
See application file for complete search history.

(56) References Cited

U.S. PATENT DOCUMENTS

| | | | |
|---|---|---|---|
| 6,173,168 B1 * | 1/2001 | Andersson | ................. 455/404.1 |
| 6,259,922 B1 * | 7/2001 | Benveniste | ................ 455/452.1 |

(Continued)

FOREIGN PATENT DOCUMENTS

| | | |
|---|---|---|
| GB | 2 399 990 A | 9/2004 |
| JP | 2006-352806 | 12/2006 |

(Continued)

OTHER PUBLICATIONS

PCT International Search Report, dated Mar. 12, 2008, in connection with International Application No. PCT/EP2007/055960.

(Continued)

*Primary Examiner* — Mahendra Patel
(74) *Attorney, Agent, or Firm* — Leffler Intellectual Property Law PLLC

(57) ABSTRACT

A method of discovering overlapping cells in a telecommunications network comprising a plurality of base stations, wherein steps carried out by an individual base station comprise determining sets of terminals in ranges of its associated cells and sending a message with information about said sets of terminals to other base stations. The method also includes receiving messages from said other base stations with information about sets of terminals in ranges of their associated cells. The individual base station calculates intersection of its own set of terminals with those received from said other base stations and classifies cells as overlapping if the corresponding intersection is equal or above a predefined level.

21 Claims, 7 Drawing Sheets

(56) References Cited

U.S. PATENT DOCUMENTS

| | | | |
|---|---|---|---|
| 2004/0054807 A1* | 3/2004 | Harvey et al. | 709/243 |
| 2004/0058679 A1* | 3/2004 | Dillinger et al. | 455/439 |
| 2004/0202940 A1* | 10/2004 | Kramer et al. | 429/306 |
| 2006/0121906 A1* | 6/2006 | Stephens et al. | 455/446 |
| 2007/0091828 A1* | 4/2007 | Ashwood-Smith | 370/256 |
| 2008/0316917 A1* | 12/2008 | Farkas et al. | 370/221 |
| 2009/0016353 A1* | 1/2009 | Li et al. | 370/395.3 |

FOREIGN PATENT DOCUMENTS

| | | |
|---|---|---|
| JP | 2007-089135 | 4/2007 |
| WO | 2006098665 A1 | 9/2006 |

OTHER PUBLICATIONS

Hebden, P. et al. "Bloom filters for data aggregation and discovery: a hierarchical clustering approach" Intelligent Sensors, Sensor Networks and Information Processing Conference, 2005. Proceedings of the 2005 International Conference on, Melbourne, Australia Dec. 5-8, 2005, Piscataway, NJ, USA, IEEE, Dec. 5, 2005, pp. 175-180, XP010894765, ISBN: 0-7803-9399-6.

Choudhury, R. et al. "A distributed mechanism for topology discovery in ad hoc wireless networks using mobile agents" Mobile and Ad Hoc Networking and Computing, 2000. MobiHOC. 2000 First Annual Workshop on, Aug. 11, 2000, pp. 145-146.

Clausen, T. (ed) et al. "Optimized link state routing protocol (olsr)" RFC 3626, Oct. 2003, Network Working Group.

Dam, M. et al. "A Generic Protocol for Network State Aggregation" Proc Radiovetenskap och Kommunikation RVK, 2005.

Bloom, B.H. "Space/Time Trade-offs in Hash Coding with Allowable Errors" Communications of the ICM, vol. 13, No. 7, Jul. 1970, pp. 422-426.

Bose, P. et al. "On the False-Positive Rate of Bloom Filters" Journal of Information Processing Letters, vol. 108, Issue 4, Oct. 2008, Elsevier North-Holland, Amsterdam, The Netherlands.

Japanese Office Action, mailed Jan. 16, 2012, in connection with Japanese Patent Application 2010-511501.

Foreign Associate provided Translation of Japanese Office Action, mailed Jan. 16, 2012, in connection with Japanese Patent Application 2010-511501.

\* cited by examiner

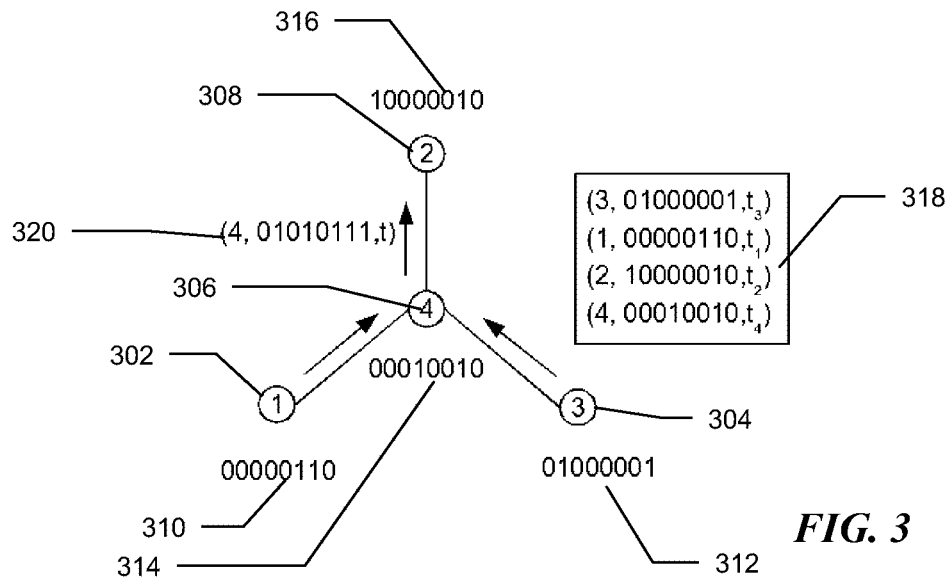

FIG. 3

```
DOC Process 1 Control Cycle
1:  O_j = { }; //Table of overlapping cells at j
2:  S_j = { }; //Summary Table at j for current control cycle
3:  S'_j = { }; //Summary Table at j for previous control cycle
4:  loop every τ seconds
5:      hash U_j(t_current) in a Bloom filter b;
6:      if (j, b', t) ∈ S_j then
7:          if (b' ≠ b) ∨ (t + ttl < t_current) then
8:              put (j, b, t_current) in S_j;
9:      else
10:         put (j, b, t_current) in S_j;
11:     for all k ∈ K_j do
12:         b' = 0; //array of zeros
13:         for all (l, b_l, t) ∈ S_j | l ≠ k do
14:             if (l, b_l, t) ∉ S'_j then
15:                 b' = b' ∨ b_l;
16:         if b' ≠ 0 then
17:             send sum(j, b', t) to k;
18:     S'_j = S_j;
19:     for all (o, t) ∈ O_j do
20:         if t + ttl < t_current then
21:             remove (o, t) from O_j;
```

FIG. 4

DOC Process 2 Processing of Incoming Messages

1: loop
2:   wait for next message $m$;
3:   if $m$ is $sum(k, b, t)$ then
4:     put $(k, b, t)$ in $S_j$;
5:     $M = \{\}$; //A set of UEs
6:     for all $ue \in U_j(t_{current})$ do
7:       hash $ue$ into Bloom filter $h$;
8:       if $(h \wedge b) = h$ then
9:         $M = M \cup \{ue\}$;
10:     if $|M| \geq H \mid H > 0$ then
11:       send $ue(j, j, M)$ to $k$;
12:   else if $m$ is $ue(k, o, M)$ then
13:     for all $(l, b, t)$ in $S_j \mid l \neq j, l \neq k$ do
14:       $M' = \{\}$;
15:       for all $ue \in M$ do
16:         hash $ue$ into Bloom filter $h$;
17:         if $(h \wedge b) = h$ then
18:           $M' = M' \cup \{ue\}$;
19:       if $|M'| \geq H \mid H > 0$ then
20:         send $ue(j, o, M')$ to $l$;
21:     if $|M \cap U_j(t_{current})| \geq H \mid H > 0$ then
22:       send $overlap(j, true)$ to $k$;
23:       put $(k, t_{current})$ in $O_j$;
24:   else if $m$ is $overlap(k, true)$ then
25:     put $(k, t_{current})$ in $O_j$;

*FIG. 5*

METHOD OF DISCOVERING OVERLAPPING CELLS

TECHNICAL FIELD

The present invention relates to radio access networks, in general, and in particular to a method of discovery of overlapping cells for use, for example, in facilitating handover process.

BACKGROUND

Cellular communications systems include a plurality of radio base stations (RBS) or simply base stations (BS) spaced from each other in order to form plurality of cells which provide radio communication in a geographic area. A mobile transceiver unit, such as a mobile phone (or a User Equipment—UE), communicates via a radio channel with the base station of the cell in which the User Equipment is currently located. Because the User Equipment is mobile the distance between it and the base station (the serving base station) may increase so that the signal becomes too weak to maintain the communication. Without any support from the network the connection would be terminated due to diminishing level of the signal received either by the User Equipment or the base station.

In order to maintain the communication a process called handover is implemented. In this process serving of the User Equipment (i.e. providing radio communication channel) is handed over from one cell to another (the cell can be formed by the same base station or by another base station). In order to maintain the continuity of the connection the handover process is carried out between overlapping cells. For two cells to be classified as overlapping, they must fulfill a set of requirements, the most basic of which is that their respective coverage areas must overlap.

In order to accomplish handover each cell in a Universal Mobile Telecommunications System (UMTS) has a list of overlapping cells, which enables both the intra- and inter-system handover processes. Therefore, the overlapping cells in a specific list may belong to the same network, operating at the same or a different frequency, or they may belong to a different mobile network, owned by another operator, or they may even be part of different system, such as a GSM network.

In the known solutions, the list of overlapping cells is an output of the network planning process. These lists are configured statically in the Radio Network Controllers (RNC), which are entities that control large sets (usually several hundreds) of Radio Base Stations (RBS). RNCs and RBSs are entities of the Universal Terrestrial Radio Access Network (UTRAN). It is envisioned that with further development of the mobile telecommunications networks the RNCs may be eliminated and their functionality divided and distributed over RBSs and other entities of the UTRAN. If the configuration of these lists will continue to be static and a result of a centralized planning process such an approach will restrict the ability of the network to react fast and rapidly reconfigure the overlapping cell lists in case of unexpected events or failures. It must be noted that the process of reconfiguring overlapping cell lists is needed after a failure, even if no coverage problem arises. The new network topology emerging as a result of the failure requires that the RBSs reconfigure their respective overlapping cell list in order to support efficient handover and avoid call drops.

Methods of discovering overlapping cells exist and few of them together with their disadvantages are discussed below.

There are known methods based on topology discovery for ad hoc networks, for example the mobile agents-based solution disclosed in R. Chpudhury, et al., "A distributed mechanism for topology discovery in ad hoc wireless networks using mobile agents," in Mobile and Ad Hoc Networking and Computing, 2000. MobiHOC. 2000 First Annual Workshop on, 11 Aug. 2000, pp. 145-146 or the topology discovery process involved in proactive routing protocols disclosed in T. Clausen (Ed.), et al., "Optimized link state routing protocol (olsr)," RFC 3626, October 2003, Network Working Group. Those methods assume that two neighbours in the topology are two nodes in range of each other. However, neighbouring base-stations of a cellular network such as UMTS may not be in range of each other.

There are other ways of discovering overlapping cells in UMTS networks. With current technology, an RNC can ask a terminal to perform an intra-frequency code search. In this way, it can discover coverage overlaps between cells, but this procedure is limited to cells operating at the same frequency as the terminal. As a consequence, such a procedure can discover neither UMTS cells working in another frequency, nor inter-system cells (e.g., GSM cells).

Hence, an improved method of discovery of overlapping cells would be advantageous and in particular one that can be implemented in a distributed environment and is fast enough to ensure high quality of handover especially in a situation of a cell failure. Accordingly, the invention seeks to preferably mitigate, alleviate or eliminate one or more of the disadvantages mentioned above singly or in any combination.

SUMMARY

According to a first aspect of the present invention there is provided a method of discovering overlapping cells in a telecommunications network comprising a plurality of base stations. The steps, carried out by an individual base station, comprise determining sets of terminals in ranges of its associated cells and sending a message with information about the sets of terminals in the ranges of its associated cells to other base stations. The method also includes receiving messages from said other base stations with information about sets of terminals in ranges of their associated cells. The individual base station calculates intersection of its own set of terminals with those received from said other base stations and classifies cells as overlapping if the corresponding intersection is equal or above a predefined level. Preferably the calculating of intersection is carried out for each cell associated with said base station.

Preferably the message sent from the base station to said other base stations comprises a representation of the set of terminals in its range and it is further preferred that the set of terminals is encoded in a Bloom filter.

In order to reduce traffic caused by sending the messages the base station sends the message along a spanning tree on a management overlay to its neighbour base stations in said management overlay. The method further comprises aggregation of information about sets of terminals received from said other base stations with information about the set of terminals in the range of cells associated with the base station. This aggregated information is then sent along a spanning tree on a management overlay to its neighbour base stations in said management overlay.

Preferably the method comprises aggregation of Bloom filters received from said other base stations with the Bloom filters representing the set of terminals in the range of cells associated with the base station. This aggregated information is then sent along a spanning tree on a management overlay to its neighbour base stations in said management overlay.

The base station determines the sets of terminals in ranges of its associated cells periodically and stores time-stamped information about the sets of terminals in a local summary table. The Bloom filters representing terminals stored in the local summary table are compared with Bloom filters representing terminals currently in ranges of the associated cells. If the new Bloom filters (i.e. representing terminals currently in ranges of the associated cells) differ from the ones stored in the local summary table the method comprises the steps of sending the new Bloom filters along a spanning tree on a management overlay to its neighbour base stations in said management overlay. The base station also overwrites the information in the local summary table with the new, time-stamped, Bloom filters.

Alternatively, instead of sending the message to the neighbouring base stations along the spanning tree on the management overlay said message is sent to all other base stations.

According to a second aspect of the present invention there is provided a base station for a telecommunications network adapted to discover cells of other base stations overlapping with its own cells. The base station is adapted to determine sets of terminals in ranges of its associated cells and to send a message with information about the sets of terminals in the ranges of its associated cells to the other base stations. The base station is also adapted to receive messages from said other base stations and the messages contain information about sets of terminals in ranges of their associated cells. Finally the base station is adapted to calculate intersection of its own set of terminals with those received from said other base stations and to classify cells as overlapping if the corresponding intersection is equal or above a predefined level.

According to a third aspect of the present invention there is provided a telecommunications network comprising a plurality of base stations, wherein an individual base station is adapted to discover cells of other base stations overlapping with its own cells. The base station is adapted to determine sets of terminals in ranges of its associated cells and to send a message with information about the sets of terminals in the ranges of its associated cells to the other base stations. The base station is also adapted to receive messages from said other base stations with information about sets of terminals in ranges of their associated cells. Finally the base station is adapted to calculate intersection of its own set of terminals with those received from said other base stations and to classify cells as overlapping if the corresponding intersection is equal or above a predefined level.

Further features of the present invention are as claimed in the dependent claims.

In terms of performance, the present invention provides the benefit of a short reaction time to external events, such as node failures and recovery. Additionally the traffic and computational overhead of the method scale with both the network size and the number of terminals in the network. Other benefits of the present invention include self-configuration that leads to reduced operational expenditure (OPEX), increased robustness and increased scalability (due to decentralisation). The solution also provides the benefit of faster reaction to external events compared to other known solutions and it is also neutral to radio access technologies, which allows it to be implemented in the present radio networks like GSM or UMTS as well as in future generation networks.

BRIEF DESCRIPTION OF THE DRAWINGS

The present invention will be understood and appreciated more fully from the following detailed description taken in conjunction with the drawings in which:

FIG. 3 is a diagram illustrating transmission and aggregation of Bloom filters in one embodiment of the present invention;

FIG. 4 illustrates a pseudocode representing the method of discovering overlapping cells in a telecommunications network in one embodiment of the present invention;

FIG. 5 illustrates a pseudocode representing the method of discovering overlapping cells in a telecommunications network in one embodiment of the present invention;

DETAILED DESCRIPTION

When it is mentioned in this invention that a terminal is in a range of a cell of a base station it must be understood broader than being served by a base station. In the particular case of known UMTS solutions, only the RBS (Radio Base Station) connected to a given terminal maintains a record of it (i.e. this base station is a serving base station). At all other RBSs with that terminal in range, the signal of that particular terminal is received but not decoded and no record is made. Therefore, implementing the present invention implies certain changes to the processes running on the RBSs. In the context of the present invention the concept of serving base station is preserved, but the base station decodes also signals from the terminals within its radio range, for which it is not a serving base station.

Figure 1:
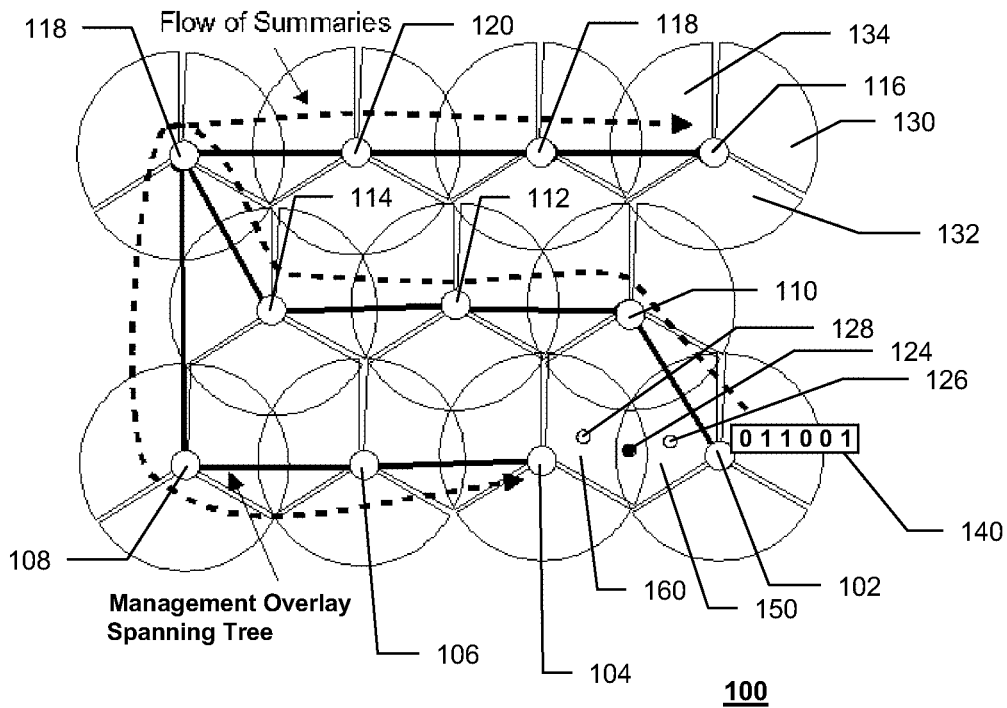
FIG. 1 is a diagram illustrating wireless telecommunication network in one embodiment of the present invention.

With reference to FIG. 1 a wireless telecommunication network 100 in one embodiment of the present invention is presented. The figure shows a plurality of base stations 102-122 each one having three 120 deg cells, 130-134. The drawing also shows terminals 124-128 distributed in the network 100 within radio coverage of some of the cells. For the sake of clarity the drawing presents the invention in a very schematic way with elements and lines not essential for understanding the invention omitted.

In one embodiment of the present invention each base station 102-122 in the network knows the terminals that are currently in range of its associated cells. (Terminals are also called User Equipments (UEs) in the UMTS context.)

Figure 6:
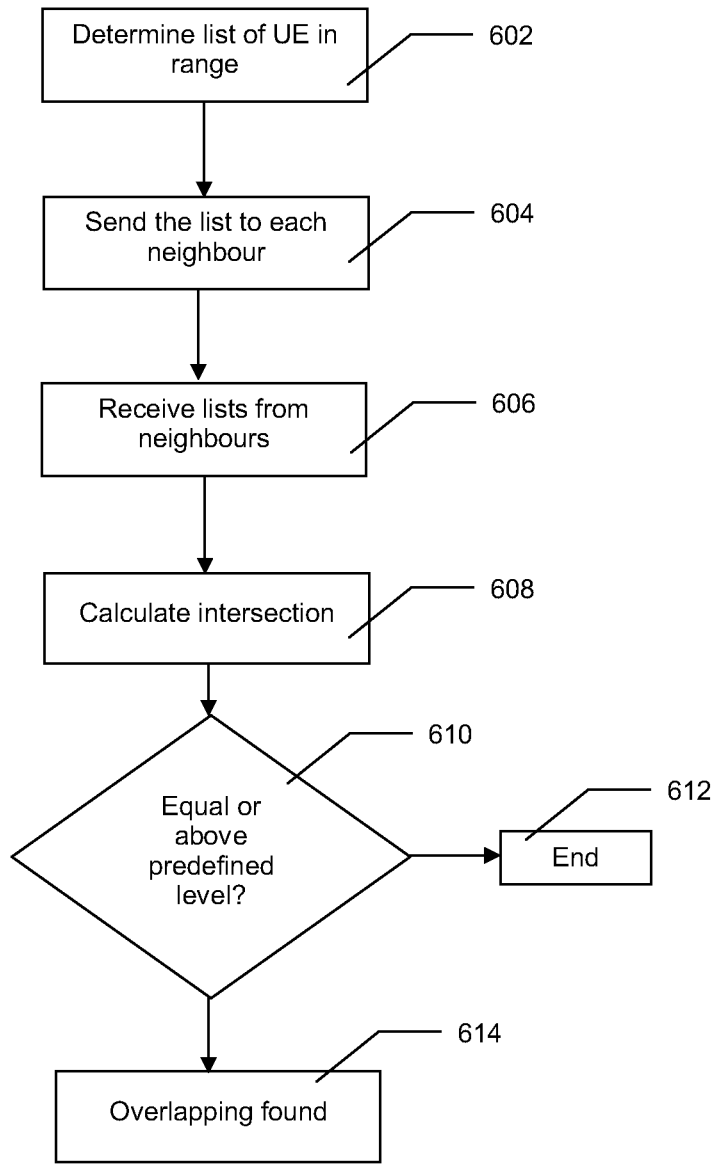
FIG. 6 is a diagram illustrating method of discovering overlapping cells in a telecommunications network in one embodiment of the present invention.
Figure 7:
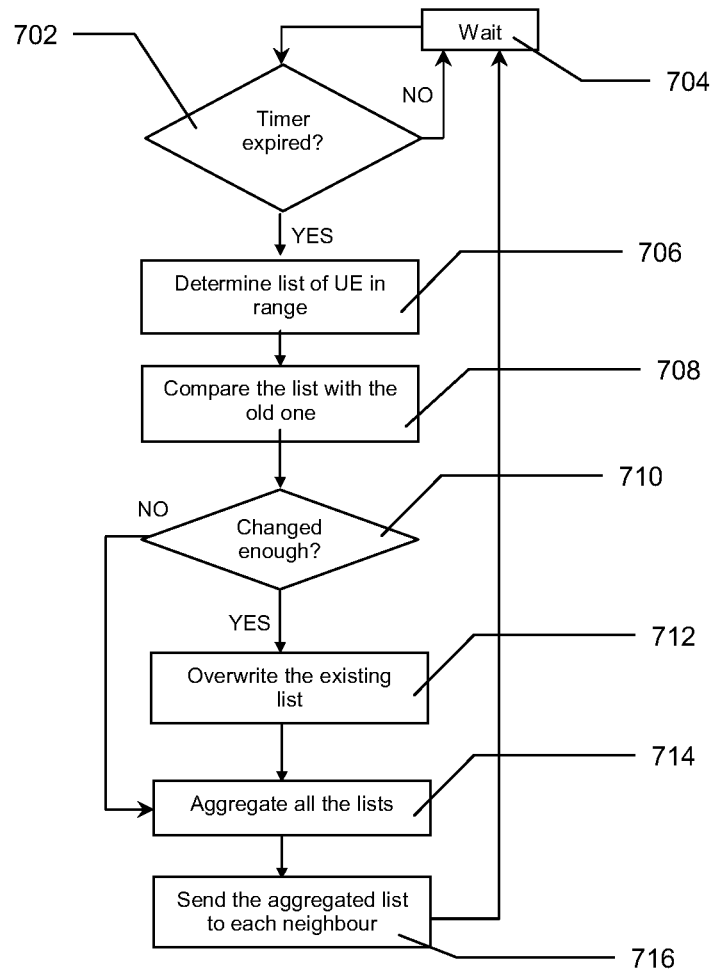
FIG. 7 is a diagram illustrating method of discovering overlapping cells in a telecommunications network in one embodiment of the present invention.
Figure 8:
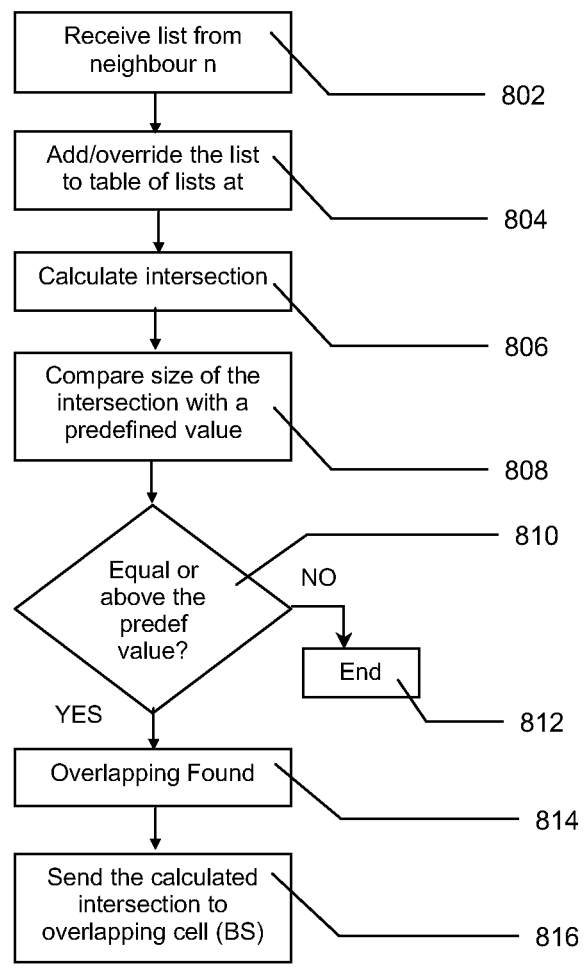
FIG. 8 is a diagram illustrating method of discovering overlapping cells in a telecommunications network in one embodiment of the present invention.

Operations of an individual base station 102 will be described with reference to FIG. 6-FIG. 8. The individual base station 102 periodically determines 602, 102, 706 sets of terminals 124, 126 in ranges of its associated cells. A base station may have one or more than one associated cells. As it is illustrated in FIG. 1 each one of the base stations 102-122 has three cells 130-134, each covering 120 deg section of geographical area, however, other arrangements of the angular coverage are also possible.

The base station 102 floods 604 a message with information about the set of terminals in its range to other base stations. In most general situation the message contains the list of terminals in its range 124, 126. It also receives 606, 802 similar information from the other base stations 104-122. Once the base station 102 has this information it computes 608, 806 the intersection of its own terminal set with those received from the other base stations. In a preferred embodiment, whenever the base station 102 finds an intersection of its set of terminals with that of another base station that is above a certain, predefined level, it concludes that there is a coverage overlap between the two corresponding cells. Alternatively, a little sharper criterion can apply, and in order to conclude that there is an overlap the found intersection must be above said predefined level.

In the embodiment illustrated in FIG. 1 the base station 102 has terminals 124 and 126 within its radio range and the base station 104 has terminals 124 and 128 within its radio range. (Or to be more precise within cells 150 and 160 respectively.) The intersection of these two sets is terminal 124.

In order to implement this solution in practice a base station must see (decode) signals not only from the terminals for which it is the serving base station, but also from other terminals that are within its radio range.

In a preferred embodiment of the invention the base station 102-122 sends a message containing a representation of the set of terminals in its range rather then the list of terminals in its range. It is also preferred that the set of terminals is encoded in a Bloom filter.

Bloom Filter

A Bloom filter is a memory-efficient way of representing a set in an array of bits with the purpose of testing whether or not an element is a member of the set. More precisely, a Bloom filter is a bit array of size m (or m×1 matrix) and includes k different hash functions. The initial value of all bits in the array is set to 0. The result of each of the hash functions is change of value of one of the bits in the array to 1, which means that each of these functions maps a key value to one of the m array positions. To add an element to a filter, the element's key (e.g. element's ID) is hashed with each of the k hash functions, each hash function produces an array position that is set to 1. To add another element to the filter the array modified during the step of adding the previous element is used.

Figure 2:
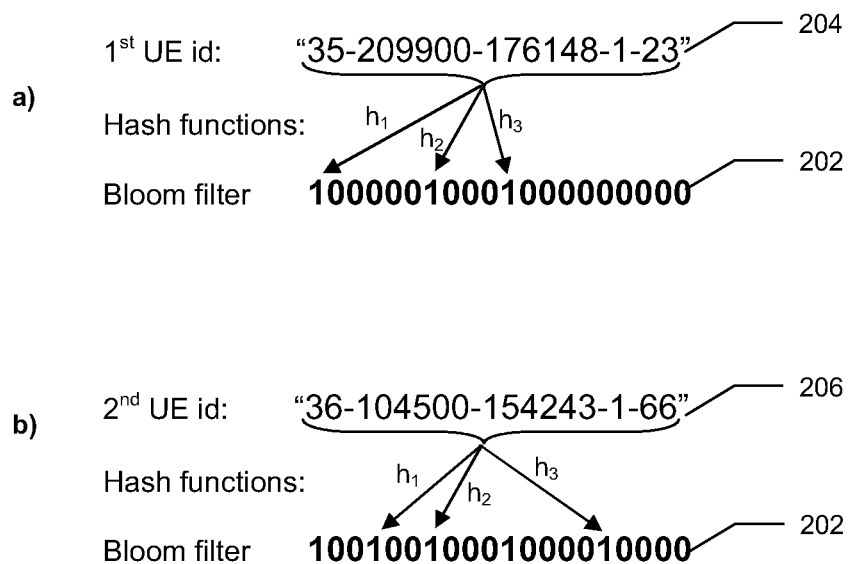
FIG. 2 illustrates the concept of a Bloom filter used in one embodiment of the present invention.

With reference to FIG. 2 a) an example of operation of a Bloom filter is illustrated. In this example an array with twenty binary positions 202 is illustrated. Initially all positions have value "0". The Bloom filter in this embodiment has 3 hash functions $h_1$, $h_2$, $h_3$. Operation of the hash function $h_1$ on the element's key, which in this embodiment is User Equipment's ID 204, results in setting to "1" the value of array's poison no. 1. Operation of the hash function $h_2$ on the same UE ID results in setting to "1" the value of the array's position no. 7 and for hash function $h_3$ the value of the array's position no. 11 is set to "1". FIG. 2 b) illustrates adding a second element 206 to the set. Hash functions $h_1$, $h_2$, $h_3$ generate "1" in the array. It is, however, possible that for two or more elements to be added to the set the hash functions generate "1" in the same position in the array as it is illustrated in this example where hash function $h_2$ generated "1" once again in position no. 7. This may result in false positives, which are briefly discussed later.

To test whether an element is a member of the set represented by a Bloom filter, its key is hashed with each of the k hash functions to obtain k array positions. If any of these positions has bit value "0", the element is not in the set. If all have value "1", the element is in the set with a certain probability. The reason why the element might not be in the set, which is called a false positive, is because the same bits might have been set to "1" during the insertion of other elements.

In summary, the relationship of the probability of false-positives on one hand and the filter size and the number of hash functions on the other hand is such that the higher the number of elements that are summarised in a given bit array, the higher the probability of a false positive. Further, for a given number of elements, one can determine a pair of array size and a number of hash functions, such that the resulting Bloom filter exhibits a reasonable low probability for false positives.

An interesting property of Bloom filters is that the Bloom filter of the union of two sets can be computed as the Boolean OR between the Bloom filters of each set. Similarly, the Bloom filter of the intersection of two sets is the Boolean AND between the Bloom filters of each set.

In the basic approach computing a deterministic intersection between two sets takes O(m×n) operations where m and n are the sizes of both sets, which in an embodiment of a telecommunications network are two sets of terminals within a range of two cells. However, in a preferred embodiment, the second of those sets is represented as a Bloom filter (like the Bloom filters 310-316 in FIG. 3) and computing a probabilistic intersection between these two sets takes O(k×m) operations. To perform calculation of this intersection it is necessary to test for membership each of the m elements in the first set against the Bloom filter, where k is the number of hash functions.

Reducing Traffic Overhead

Figure 9:
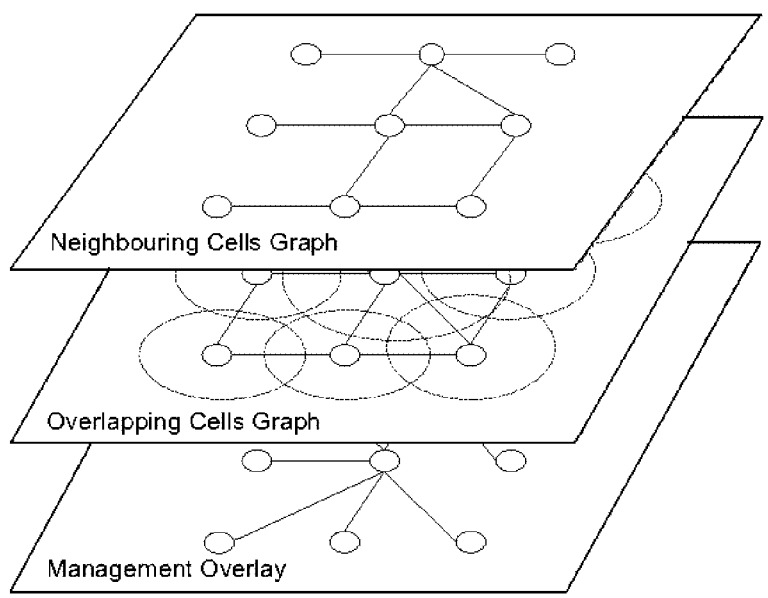
FIG. 9 is a diagram illustrating three graphs of the network in one embodiment of the present invention.

In a preferred embodiment the sets of terminals encoded in Bloom filters 140, 310-316 are sent by the base station 102, 302-308 along a spanning tree on a management overlay to its neighbour base stations in said management overlay. An overlay network is a virtual network, which is a subset of the nodes of one or more networks that have agreed to be mutually accessible in pursuit of some common purpose. The management overlay is an overlay network build to pursuit management tasks. Base station 102 sends the Bloom filter 140 to the base station 110 as they are neighbours on the management overlay. The dashed line in FIG. 1 illustrates the direction of flow of summaries (i.e. Bloom filters representing the sets of terminals within radio range of a cell). This flow goes along the management overlay. It must be noted that a neighbour base station on a management overlay may not be a neighbour base station geographically, which is illustrated in FIG. 9.

In order to reduce the traffic related to exchanging the messages the base station carries out aggregation 714 of information about the sets of terminals received 802 from said other base stations with information about its own set of terminals. This aggregated information is then sent 716 along a spanning tree on a management overlay to its neighbour base stations.

The process of aggregation, sending summaries and storing them in a local summary table is explained with reference to FIG. 3. Base stations (nodes) 302, 304 and 308 are connected with base station 306 by the management overlay. Because each of the base stations in the network sends its own summary (Bloom filter) to its neighbour on the management overlay, the base station 302 sends its Bloom filter 310 to the base station 306. Similarly the base station 304 send its Bloom filter 312 to the base station 306 and the base station 308 sends Bloom filter 316 to the base station 306. The base station 306 aggregates 714 the received summaries 310, 312, 316 with its own summary 314 and stores it in a local summary table 318. The base station 306 sends to each of its neighbouring base stations 302, 304 and 308 Bloom filters representing unions of its own Bloom filter 314 with the Bloom filters from the two other neighbouring base stations. In the example illustrated in FIG. 3 the base station 306 sends to the base station 308 a union of Bloom filters 310, 312 and 314. As it was mentioned earlier an interesting property of Bloom filters is that the Bloom filter of the union of two sets can be computed as the Boolean OR between the Bloom filters of each set. What is also important, the resulting merged Bloom filter will still recognize any input recognized by any of its ancestors. Similarly, the base station 306 sends towards base station 302 the union of Bloom filters 312, 314 and 316 and towards the base station 304 the union of Bloom filters 310, 314 and 316.

By aggregating 714 messages from different nodes (base stations) the number of messages exchanged between the base stations is reduced. Additionally by performing the aggregation 714 using union of Bloom filters the size of those messages is kept constant. Both strategies together reduce the traffic overhead compared to a scheme in which each node broadcasts its set of terminals independently.

Calculating Intersection

Once the base station 102 has the Bloom filter that represents the set of terminals within radio range of its associated cell and received corresponding Bloom filters from the other base stations it calculates 608, 806 the intersections of the sets of terminals.

Although in the description of the embodiments of the invention Bloom filters 140, 310-316 are used to represent the sets of User Equipment it is envisaged that in alternative embodiments of this invention other representations of the sets can be used instead of the Bloom filters. In yet another alternative embodiment lists of terminals in the sets can be sent between the nodes and used to calculate the intersections and identify the overlapping cells.

Functionally, the objective of the method is to build a graph represented by the connectivity matrix $$\text{Overlap}_{ij}(t) = \begin{cases} 1, & \text{if } |U_i(t) \cap U_j(t)| \geq H, H \in N \\ 0, & \text{else} \end{cases}$$

where $U_i(t)$ is the set of UEs inside the cell i at time t, and H is the minimum number of terminals in the intersection $U_i(t) \cap U_j(t)$ so that we call the two cells i and j overlapping. The threshold H serves as a hysteresis to avoid oscillations and its optimal value must be determined experimentally.

The principles driving the method are decentralization to achieve fast update of the overlapping cells topology and probabilistic representation as well as aggregation of terminal sets to reduce calculation and traffic overhead.

Every node 102-122 that executes the method disseminates information along the spanning tree in two ways. First, in a preferred embodiment, a node periodically sends 604 a summary of its terminal set to its neighbours on the management overlay. These neighbours, in turn, aggregate 714 this information with summaries of their neighbours and send 716 the resulting summary in the same way. The summary is in a preferred embodiment a Bloom filter 140, 310-316 representing set of terminals 124, 126 in a range of a cell 150 of a base station 102. The algorithm for producing Bloom filters is used to produce these summaries as well as for the aggregation 714 process.

With reference to FIG. 3 the node (base station) 306 keeps information about the summaries it receives from its neighbours in a local summary table 318 and compares 710 Bloom filters representing terminals currently in ranges of the associated cells with the ones stored in the local summary table 318. If the new Bloom filters 710 differ from the ones stored in the local summary table 318 the base station 306 sends 716 the new Bloom filters along the spanning tree on the management overlay to its neighbour base stations. Additionally the base station 306 overwrites 712 the information in the local summary table with the new Bloom filters. The Bloom filters newly added are time-stamped. This means that the base station 306 disseminates the new Bloom filters only if they changed, which is a way of reducing the traffic.

In response to the summary that the individual base station has received from its neighbour, it calculates 608, 806 the intersection of its terminals with the summary from the neighbour. Then the individual base station returns 816 the intersection to said neighbour, which, in turn, uses its own summary table to route that information towards base stations that may be overlapping with said individual base station.

These two processes are designed for a base station to detect other base stations with jointly overlapping cells. All base station's states expire using a soft state concept, which allows the method to deal with cases where overlaps disappear.

In a preferred embodiment the method operates on a management overlay that provides transport services. This overlay has the topology of a spanning tree. There are many protocols available for building such trees on top of the existing IP-based management network that interconnects all base stations, but they are not part of this invention and will not be discussed here.

An embodiment of the method implemented in an individual base station is discussed below with reference to pseudocode illustrated in FIG. 4 and FIG. 5 and flowcharts illustrated in FIG. 6 to FIG. 8.

Summary Table

This is a table of the received Bloom filters summarizing sets of UEs (or terminals) indexed by the ID of the node that has sent the summary. The summary table 318 at node j is represented as $S_j$ in the pseudocode.

Summary Table at Previous Control Cycle

This table keeps the last summary sent from each neighbour in the management overlay to avoid aggregating summaries when nothing has changed in them. The summary table from the previous control cycle at node j is represented as $S'_j$ in the pseudocode.

Table of Overlapping Cells

This is the set of cells which are currently overlapping with the local cell (e.g. cells 150 and 160 in FIG. 1). Each element in the set is time stamped when inserted. This set at node j is represented as $O_j$ in the pseudocode.

Set of User Equipments in Range

This is the set of the UEs inside a given cell at a given time. In the pseudocode is represented as $U_j(t)$ for the cell j and the time t.

Set of Management-Overlay Neighbours

This is the set of neighbours in the management overlay, not necessarily related with the UMTS neighbouring cell concept. In the pseudocode is represented as $K_j$ for the node j.

Types of Messages

Summary Message

This message is a tuple sum(node_id, bloom_filter; time_stamp) used for communicating summaries of UE sets.

UE-list Message

This message is a tuple ue(forwarding_node, source, set_of_$_{UE}$_ids) used to communicate an explicit set of UEs.

Overlapping Message

This is a pair overlap (node_id, boolean) that communicates a confirmed overlapping relationship.

Pseudocode

FIGS. 4 and 5 show the pseudocode of one embodiment of discovering of overlapping cells method (DOC method). It is structured in two processes which run asynchronously and independently on each node (radio base station) in the network. DOC Process 1 describes the local control cycle of the method, which is periodically executed on each node.

DOC Process 1 in FIG. 4 is a loop that is executed every τ seconds. First, the set of terminals 124, 126 in range is determined 706, encoded in a Bloom filter and inserted in the Summary Table (lines 6-10). Lines 11 to 17 describe the aggregation 714 and forwarding process. For each neighbour k on the spanning tree, the node aggregates 714 those entries in the summary table that have changed since the previous control cycle and sends the aggregate to k if changes have occurred (lines 21-22). Next, the state of the summary table is saved (line 18). Finally, the node removes those entries from the set of overlapping cells that have recently been refreshed (lines 19-21).

DOC Process 2 in FIG. 5 describes how a node processes messages containing Bloom filters (summaries) that it receives from its FIFO input queue. Upon receiving a message containing Bloom filters (summary message), the node computes 608, 806 the (probabilistic) intersection between its terminal set and the received summary. If the intersection is sufficiently large 610, 810, then the intersection set is returned to the neighbour who sent the summary (lines 3-11) 816. Upon receiving a message with an intersection set (UE-list message), the node computes the probabilistic intersection between the received intersection set and each of the summaries in its summary table. The UE list is an intersection itself, but in this operation it is intersected again with the Bloom filters in the summary table in order of breaking the UE list into smaller parts and to route each part towards the right destination. For each case, if the resulting intersection set is sufficiently large 810, the node sends this intersection set to the corresponding neighbour (lines 13-20) 816. Also, in a preferred embodiment, the node computes the deterministic intersection between the received intersection set and its terminal set. This is done to reduce the influence of false positives and improve accuracy of the method. If this intersection is sufficiently large, an overlap message is sent back to the originator of the received message containing Bloom filters (summaries). In addition the node adds the originator of the message containing Bloom filters (summaries) to its set of overlapping cells (lines 21-23). Upon receiving an overlap message, the node adds the originator of the overlap message to its set of overlapping cells (line 25).

The control parameters of this algorithm are the control period τ, the Bloom filter parameters k and m, the intersection threshold H for considering two cells to be overlapping and the time to live (ttl) after which the node state variables expire. In the implementation of the algorithm when the local summaries are too old they are computed again. Similarly, too old overlaps are also erased. If the overlaps still exist they are renewed during the process, if they do not exist (for example a cell crash) the overlaps will not be discovered and the list of overlapping cells will be updated.

The method described above is a novel probabilistic method that detects and continuously tracks the coverage overlaps among cells. By doing that, it maintains a distributed graph of overlapping cells. To be configured as neighbours, two cells must be at least overlapping. Therefore, this graph is of critical importance in order to develop an automatic neighbouring cells configuration method. Using Bloom filters and aggregation techniques, this method exhibits a low traffic and computational overhead and is scalable with respect to network size and the number of terminals.

The present invention uses information about the terminals that is typically available in devices of the access network. Therefore, the deployment of the invention can be restricted to the management plane, without requiring changes to the control plane or the radio capabilities of network devices and User Equipment. Given its assumptions and requirements the method will work on UMTS, GSM networks as well as on future generation networks where decentralised configuration of neighbouring cells is implemented.

The invention claimed is:

1. A method of discovering overlapping cells in a telecommunications network comprising a plurality of base stations, wherein the steps carried out by an individual base station comprise:
   determining sets of terminals in ranges of its associated cells;
   sending a message with information about the sets of terminals in the ranges of its associated cells to other base stations;
   receiving messages from said other base stations with information about sets of terminals in ranges of their associated cells;
   calculating intersection of its own set of terminals with those received from said other base stations; and
   classifying cells as overlapping if the corresponding intersection is equal or above a predefined level,
   wherein the base station sends the message along a spanning tree on a management overlay to its neighbour base stations in said management overlay.

2. The method according to claim 1, wherein the message sent from the base station to said other base stations comprises a representation of the set of terminals in its range.

3. The method according to claim 2, wherein the set of terminals is encoded in a Bloom filter.

4. The method according to claim 1, comprising a step of aggregation of information about sets of terminals received from said other base stations with information about the set of terminals in the range of cells associated with the base station and sending this aggregated information along a spanning tree on a management overlay to its neighbour base stations in said management overlay.

5. The method according to claim 1, comprising a step of aggregation of Bloom filters received from said other base stations with the Bloom filters representing the set of terminals in the range of cells associated with the base station and sending this aggregated information along a spanning tree on a management overlay to its neighbour base stations in said management overlay.

6. The method according to claim 1, wherein the base station determines the sets of terminals in ranges of its associated cells periodically and stores the information about the sets of terminals time-stamped in a local summary table.

7. The method according to claim 6 comprising comparing Bloom filters representing terminals currently in ranges of the associated cells with the ones stored in the local summary table and if the new Bloom filters differ from the ones stored in the local summary table:
   sending the new Bloom filters along a spanning tree on a management overlay to its neighbour base stations in said management overlay; and
   overwriting the information in the local summary table with the new, time-stamped, Bloom filters.

8. A base station or a telecommunications network adapted to discover cells of other base stations overlapping with its own cells, wherein in the process of discovery the individual base station is adapted to:

determine sets of terminals in ranges of its associated cells;

send a message with information about the sets of terminals in the ranges of its associated cells to the other base stations;

receive messages from said other base stations with information about sets of terminals in ranges of their associated cells;

calculate intersection of its own set of terminals with those received from said other base stations; and classify cells as overlapping if the corresponding intersection is equal or above a predefined level, wherein the base station is adapted to send the message along a spanning tree on a management overlay to its neighbour base stations in said management overlay.

9. The base station according to claim 8, wherein the message sent from the individual base station to said other base stations comprises a representation of the set of terminals in its range.

10. The base station according to claim 9, wherein the set of terminals is encoded in a Bloom filter.

11. The base station according to claim 8 adapted to aggregate information about sets of terminals received from said other base stations with information about the set of terminals in the range of cells associated with the base station and to send this aggregated information along a spanning tree on a management overlay to its neighbour base stations in said management overlay.

12. The base station according to claim 8 adapted to aggregate Bloom filters received from said other base stations with the Bloom filters representing the set of terminals in the range of cells associated with the base station and to send this aggregated information along a spanning tree on a management overlay to its neighbour base stations in said management overlay.

13. The base station according to claim 12, adapted to periodically determine the sets of terminals in ranges of its associated cells and to store the information about the sets of terminals time-stamped in a local summary table.

14. The base station according to claim 13 adapted to compare Bloom filters representing terminals currently in ranges of the associated cells with the ones stored in the local summary table and if the new Bloom filters differ from the ones stored in the local summary table:
- to send the new Bloom filters along a spanning tree on a management overlay to its neighbour base stations in said management overlay; and
- to overwrite the information in the local summary table with the new, time-stamped, Bloom filters.

15. A telecommunications network comprising a plurality of base stations, wherein an individual base station is adapted to discover cells of other base stations overlapping with its own cells, wherein in the process of discovery the base station is adapted to:

determine sets of terminals in ranges of its associated cells;

send a message with information about the sets of terminals in the ranges of its associated cells to the other base stations;

receive messages from said other base stations with information about sets of terminals in ranges of their associated cells;

calculate intersection of its own set of terminals with those received from said other base stations; and classify cells as overlapping if the corresponding intersection is equal or above a predefined level, wherein the individual base station is adapted to send the message along a spanning tree on a management overlay to its neighbour base stations in said management overlay.

16. The network according to claim 15, wherein the message sent from the individual base station to said other base stations comprises a representation of the set of terminals in its range.

17. The network according to claim 16, wherein the set of terminals is encoded in a Bloom filter.

18. The network according to claim 15, wherein the individual base station is adapted to aggregate information about sets of terminals received from said other base stations with information about the set of terminals in the range of cells associated with the base station and to send this aggregated information along a spanning tree on a management overlay to its neighbour base stations in said management overlay.

19. The network according to claim 15, wherein the individual base station is adapted to aggregate Bloom filters received from said other base stations with the Bloom filters representing the set of terminals in the range of cells associated with the base station and to send this aggregated information along a spanning tree on a management overlay to its neighbour base stations in said management overlay.

20. The network according to claim 15, wherein the individual base station is adapted to periodically determine the sets of terminals in ranges of its associated cells and to store the information about the sets of terminals time-stamped in a local summary table.

21. The network according to claim 20, wherein the individual base station is adapted to compare Bloom filters representing terminals currently in ranges of the associated cells with the ones stored in the local summary table and if the new Bloom filters differ from the ones stored in the local summary table:
- to send the new Bloom filters along a spanning tree on a management overlay to its neighbour base stations in said management overlay; and
- to overwrite the information in the local summary table with the new, time-stamped, Bloom filters.

* * * * *

UNITED STATES PATENT AND TRADEMARK OFFICE
CERTIFICATE OF CORRECTION

PATENT NO. : 8,781,459 B2  
APPLICATION NO. : 12/664145  
DATED : July 15, 2014  
INVENTOR(S) : Baliosian et al.

Page 1 of 1

It is certified that error appears in the above-identified patent and that said Letters Patent is hereby corrected as shown below:

Title page, item (75), under "Inventors", in Column 1, Line 2, delete "(CH)" and insert -- (SE) --, therefor.

In the Specification

In Column 2, Line 3, delete "R. Chpudhury, et al.," and insert -- R. Choudhury, et al., --, therefor.

In Column 4, Line 4, delete "invention:" and insert -- invention; --, therefor.

In Column 5, Line 23, delete "then" and insert -- than --, therefor.

In Column 5, Lines 56-59, delete ""1" in the............discussed later." and insert the same at Line 55, after "generate", as a continuation paragraph.

In Column 8, Line 57, delete "bloom_filter;" and insert -- bloom_filter, --, therefor.

In Column 8, Line 61, delete "set_of_$_{UE}$_ids)" and insert -- set_of_UE_ids) --, therefor.

Signed and Sealed this  
Fourth Day of August, 2015

Michelle K. Lee  
*Director of the United States Patent and Trademark Office*